(12) United States Patent
Fein et al.

(10) Patent No.: US 9,838,456 B2
(45) Date of Patent: Dec. 5, 2017

(54) MEDIA FILE SYNCHRONIZATION

(71) Applicant: EMPIRE TECHNOLOGY DEVELOPMENT LLC, Wilmington, DE (US)

(72) Inventors: Gene Fein, Malibu, CA (US); Edward Merritt, Lenox, MA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 46 days.

(21) Appl. No.: 14/563,709

(22) Filed: Dec. 8, 2014

(65) Prior Publication Data

US 2015/0113161 A1  Apr. 23, 2015

Related U.S. Application Data

(63) Continuation of application No. 12/367,287, filed on Feb. 6, 2009, now Pat. No. 9,077,784.

(51) Int. Cl.
| | |
|---|---|
| *G06F 5/00* | (2006.01) |
| *H04L 29/06* | (2006.01) |
| *H04L 29/08* | (2006.01) |

(52) U.S. Cl.
CPC .......... *H04L 65/80* (2013.01); *H04L 65/4023* (2013.01); *H04L 65/605* (2013.01); *H04L 65/608* (2013.01); *H04L 67/06* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 6,526,070 B1 * | 2/2003 | Bernath et al. | 370/509 |
| 6,611,754 B2 | 8/2003 | Klein | |
| 6,636,836 B1 | 10/2003 | Pyo | |
| 7,028,306 B2 | 4/2006 | Boloker et al. | |
| 7,124,087 B1 | 10/2006 | Rodriguez et al. | |
| 7,124,125 B2 | 10/2006 | Cook et al. | |
| 7,177,995 B2 * | 2/2007 | Yagawa | 711/162 |
| 7,533,061 B1 | 5/2009 | Cheng et al. | |
| 7,653,761 B2 | 1/2010 | Juster et al. | |

(Continued)

FOREIGN PATENT DOCUMENTS

| | | |
|---|---|---|
| JP | 2002108838 A | 4/2002 |
| JP | 2004288025 A | 10/2004 |

(Continued)

OTHER PUBLICATIONS

"Cloud Computing", accessed from URL: http://en.wikipedia.org/wiki/cloud computing on Jun. 25, 2008, 15 pages.

(Continued)

*Primary Examiner* — Henry Tsai
*Assistant Examiner* — Juanito Borromeo
(74) *Attorney, Agent, or Firm* — Moritt Hock & Hamroff LLP; Steven S. Rubin, Esq.

(57) ABSTRACT

The description generally relates to a system designed to synchronize the rendering of a media file between a master device and a sister device. The system is designed so that a media file is simultaneously rendered on a master device and a sister device beginning from identical temporal starting points.

20 Claims, 12 Drawing Sheets

(56) References Cited

U.S. PATENT DOCUMENTS

| | | |
|---|---|---|
| 7,756,753 B1 | 7/2010 | McFarland |
| 7,949,713 B2 | 5/2011 | Naito et al. |
| 7,953,118 B2 * | 5/2011 | Krantz ................ H04Q 3/0025 370/503 |
| 7,996,422 B2 | 8/2011 | Shahraray et al. |
| 8,204,487 B2 * | 6/2012 | Hurowitz et al. ......... 455/414.1 |
| 8,239,275 B1 | 8/2012 | Lyren et al. |
| 2002/0032905 A1 | 3/2002 | Sherr et al. |
| 2002/0099860 A1 | 7/2002 | Miller et al. |
| 2002/0120675 A1 | 8/2002 | Everett et al. |
| 2004/0024580 A1 | 2/2004 | Salmonsen et al. |
| 2004/0093155 A1 | 5/2004 | Simonds et al. |
| 2004/0190046 A1 | 9/2004 | Ilda |
| 2005/0021637 A1 | 1/2005 | Cox |
| 2005/0091107 A1 | 4/2005 | Blum |
| 2005/0239401 A1 | 10/2005 | Nam |
| 2005/0256923 A1 | 11/2005 | Adachi |
| 2006/0126452 A1 | 6/2006 | Yamashita et al. |
| 2006/0190559 A1 | 8/2006 | Lim |
| 2007/0100840 A1 | 5/2007 | Matsubara |
| 2007/0150444 A1 | 6/2007 | Chesnais et al. |
| 2007/0180100 A1 | 8/2007 | Biggs et al. |
| 2007/0220552 A1 | 9/2007 | Juster et al. |
| 2007/0239899 A1 | 10/2007 | Gonen et al. |
| 2008/0183678 A1 | 7/2008 | Weston et al. |
| 2008/0257134 A1 | 10/2008 | Oppenheimer |
| 2009/0055377 A1 | 2/2009 | Hedge et al. |
| 2009/0056525 A1 | 3/2009 | Oppenheimber |
| 2010/0154021 A1 * | 6/2010 | Howarter et al. ............ 725/141 |

FOREIGN PATENT DOCUMENTS

| | | |
|---|---|---|
| JP | 2005071381 A | 3/2005 |
| JP | 2005339523 A | 12/2005 |
| JP | 2006146980 A | 6/2006 |
| JP | 2006268654 A | 10/2006 |
| JP | 2007094738 A | 4/2007 |
| JP | 2007233515 A | 9/2007 |
| JP | 2008502176 A | 1/2008 |
| JP | 2008117222 A | 5/2008 |
| JP | 2008269382 A | 11/2008 |
| KR | 1020060092317 A | 8/2006 |
| KR | 1020070040592 A | 4/2007 |
| WO | 2007011329 A1 | 1/2007 |
| WO | 2007016463 A2 | 2/2007 |
| WO | 2007044590 A2 | 4/2007 |
| WO | 2007106260 A2 | 9/2007 |
| WO | 2008054505 A2 | 5/2008 |

OTHER PUBLICATIONS

From Wikipedia, "Mood Logic," printed Aug. 22, 2008; http://en.wikipedia.org/wiki/MoodLogic, 3 pages.

English translation of Korean patent publication 1020070040592 abstract, dated Apr. 17, 2007, 1 page.

* cited by examiner

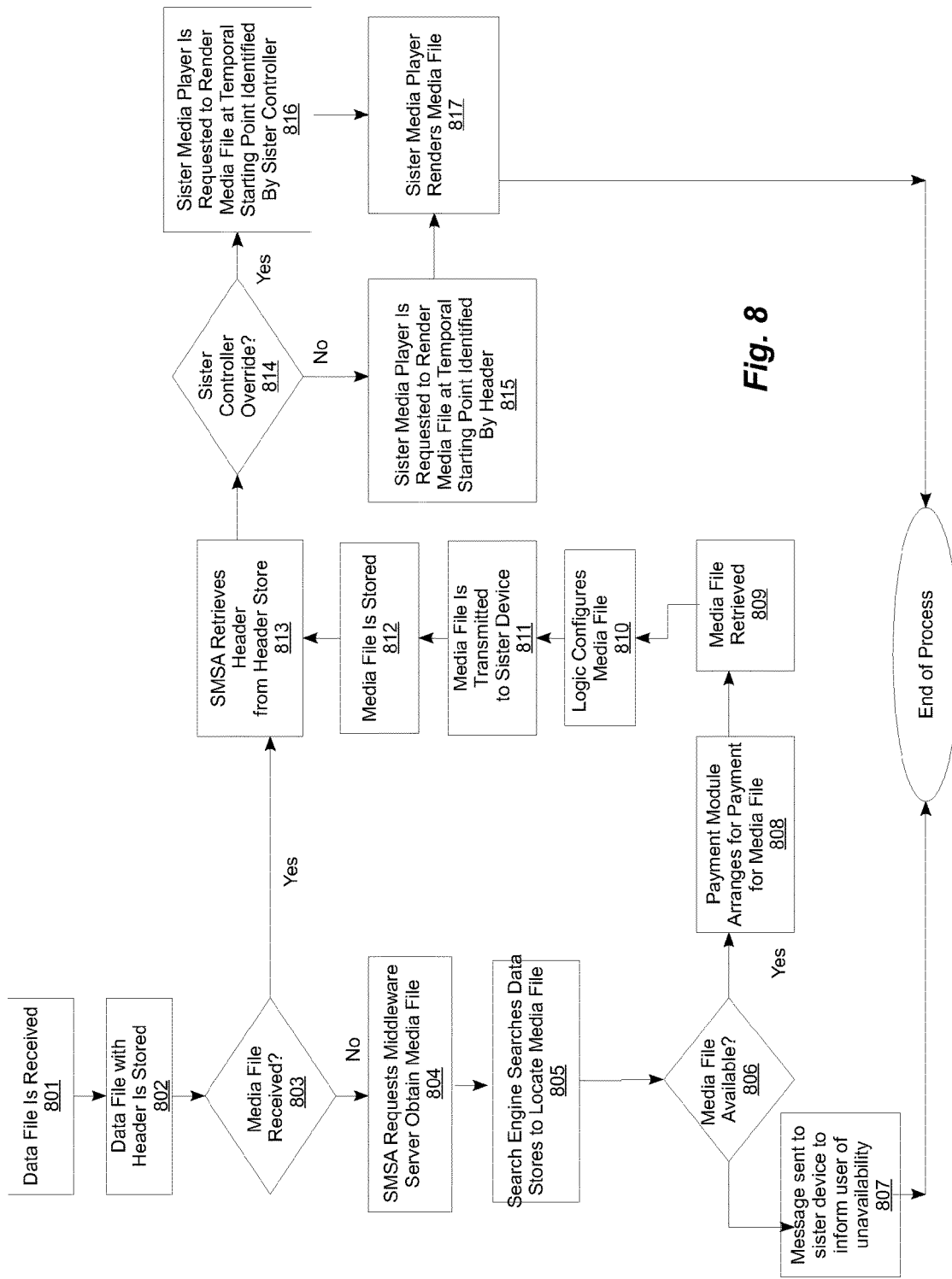

900 Computer Program Product

902 Computer-Readable Medium

904 Computer-Executable Instructions:

receiving a data file at a sister device, the data file including a media code and a time code, the media code identifying a media file, and the time code identifying a temporal starting point within the media file; storing the media file; and rendering the media file from the temporal starting point.

receiving a request at a middleware server to search for a media file; searching for the media file; acquiring the media file; and transmitting the media file to a sister device.

Sensing the presence of a sister device; creating a data file, the data file including a media code and a time code, the media code identifying a media file, and the time code identifying a temporal starting point within the media file; storing the data file; and rendering the media file from the temporal starting point

| 906 Recordable Medium | 908 Communications Medium |

*Fig. 9*

MEDIA FILE SYNCHRONIZATION

CROSS REFERENCE TO RELATED APPLICATION

This application is a continuation under 35 U.S.C. §120 of U.S. application Ser. No. 12/367,287 filed on Feb. 6, 2009, now U.S. Pat. No. 9,077,784, issued on Jul. 7, 2015, the entirety of which is hereby incorporated by reference.

BACKGROUND INFORMATION

It is well known that media files may be transferred from one device to another via various means. Currently, a media file is transferred from one device to another, and subsequently the user selects a point within the media file to be the starting point from which the media file will be rendered.

With users of media files desiring to experience the same media content on multiple devices, it is more imperative than ever to create systems that allow the synchronization of media files across various devices and which further allow the acquisition of media files which are resident on one device but not others.

Unfortunately, an adequate solution that addresses these issues has eluded those skilled in the art, until now.

SUMMARY

The present disclosure describes solutions that enable the synchronization of one or more media files between a master device and a sister device, so that the media file is simultaneously rendered on both devices beginning from identical temporal starting points. The use of a computer network is employed with middleware to condition the media file in a manner which makes the media file compatible with the sister device. The data transactions between the middleware and the sister device may also be handled to search for the appropriate media file, acquire it, and transmit it to the sister device.

The foregoing is a summary that thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings.

FIG. 8 illustrates by way of a schematic flow diagram another embodiment of the present system and method for media synchronization.

FIG. 9 is a diagram generally illustrating a computer product configured to perform processing for the media synchronization system shown in FIG. 1.

Figure 1:
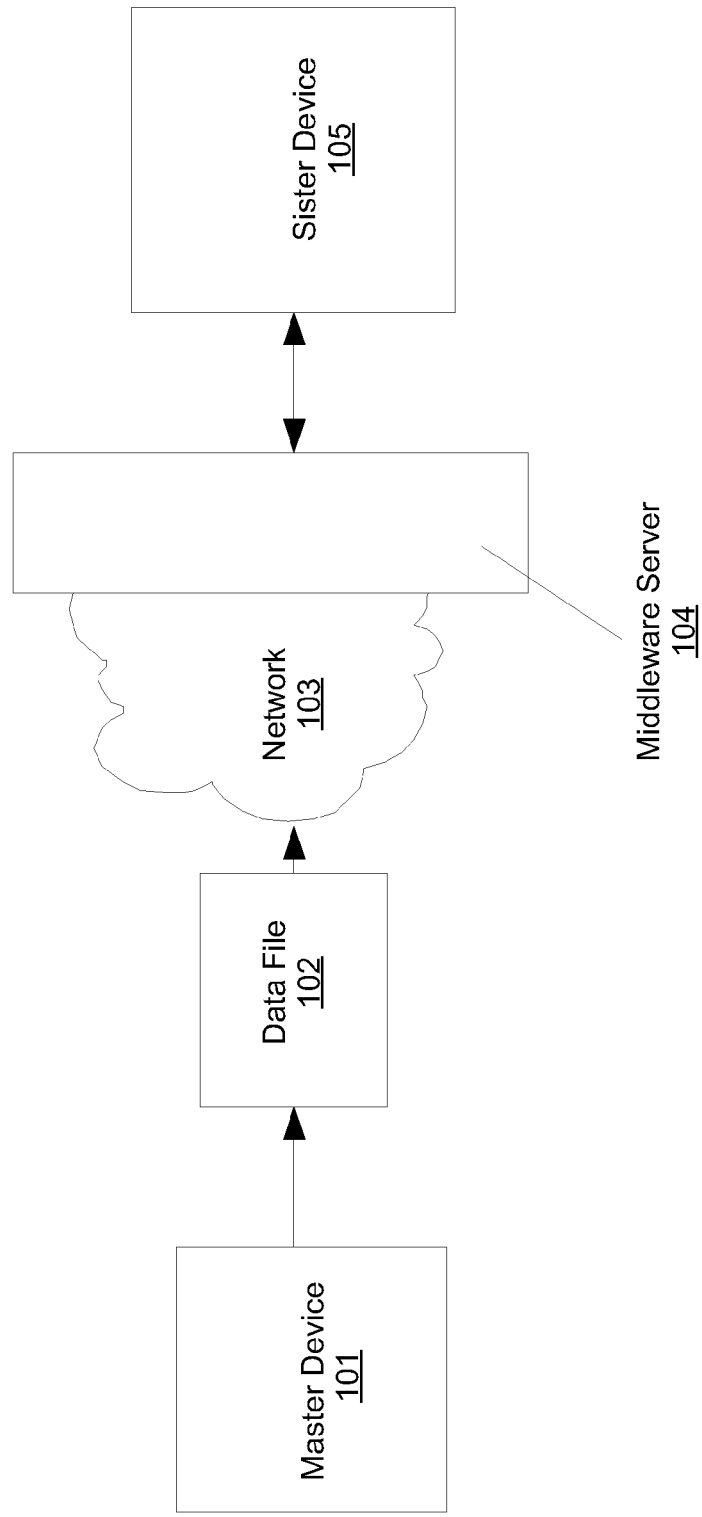
FIG. 1 is a functional block diagram of a computing environment implementing one embodiment of a system for media synchronization.

It should be noted that the embodiments illustrated in these figures are representative only, and are not exclusive of all the embodiments that may implement a media synchronization system.

DETAILED DESCRIPTION OF ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to a media synchronization system. Certain preferred embodiments of one such system are illustrated in the figures and described below. Many other embodiments are also possible, however, time and space limitations prevent including an exhaustive list of those embodiments in one document. Accordingly, other embodiments within the scope of the claims will become apparent to those skilled in the art from the teachings of this patent.

FIG. 1 is a functional block diagram of a computing environment implementing one embodiment of a system for media synchronization. As shown, master device 101 transmits data file 102 to sister device 105, through a "middleware" server 104 connected to a network 103. Briefly described, the master device 101 may be any device, either mobile or non-mobile, capable of rendering media files such as MP3 files, WAV files, MPEG files, and the like. Several examples of master device 101 include a wireless handheld device, a digital video recorder, a home media server, or any other mobile or non-mobile device capable of rendering media files.

Sister device 105 may be any device, either mobile or non-mobile, capable of rendering media files such as MP3 files, WAV files, MPEG files, and the like. Several examples of sister device 105 include a home media server, a digital video server, a video receiver, a computer, a cellular telephone, a smart telephone, a personal digital assistant (PDA), a digital music player, a digital video player, a portable video player, a wireless handheld device, a mobile communication device, a vehicle navigation system, a vehicle media system, a laptop personal computer (PC), a notebook PC, a mobile computing device, or any other mobile or non-mobile device capable of rendering media files.

Figure 2:
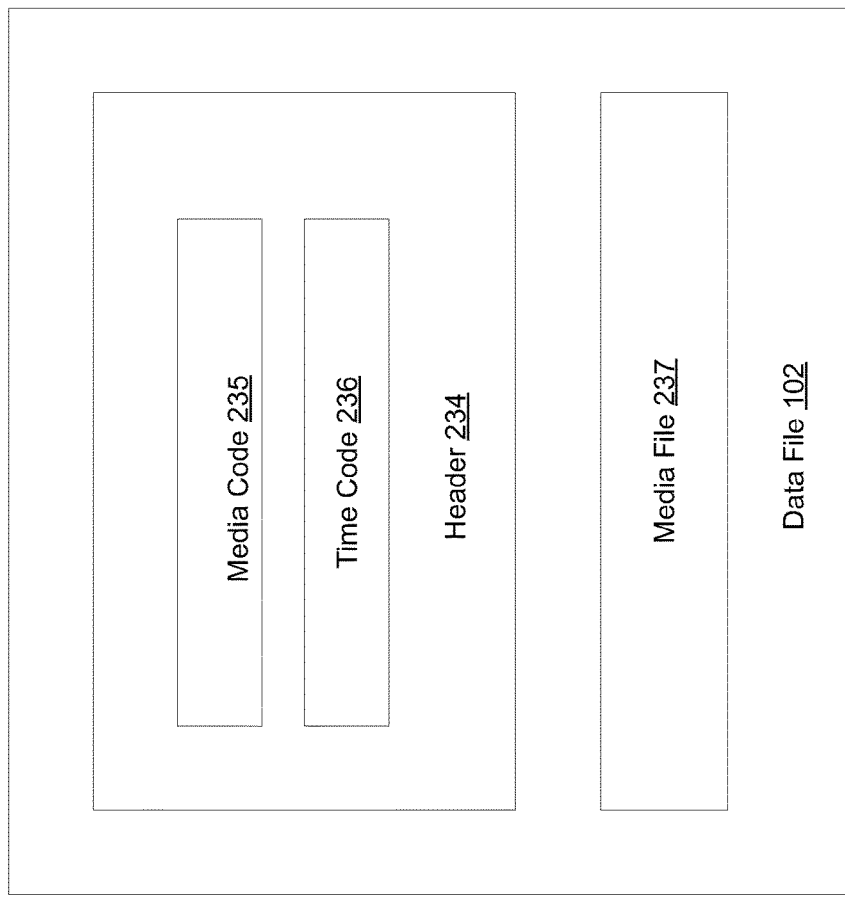
FIG. 2 is a functional block diagram illustrating in greater detail one implementation of the data file introduced in conjunction with FIG. 1.

The data file 102 is described in greater detail below in conjunction with FIG. 2. FIG. 2 is a functional block diagram illustrating in greater detail one implementation of the data file introduced in conjunction with FIG. 1. Briefly described, the data file 102 includes a header 234. Header 234 includes a media code 235 which uniquely identifies media file 237 from other media files, such as by title or description. Media file 237 may be an MP3 file, a WAV file, an MPEG file, or any other video file, audio file, or audiovisual file which, when rendered by a mobile or non-mobile device, allows the user to view video content, listen to audio content, or view and listen to audiovisual content. In the illustrated embodiment of FIG. 2, the media file 237 is included in data file 102. In other embodiments, media file 237 may be resident on sister device 105 or available for acquisition via network 103.

Header 234 also includes a time code 236 which corresponds to a temporal starting point within media file 237. For instance, time code 236 may identify the temporal starting point "1:05" within media file 237, indicating that upon receipt of data file 102, media file 237 is to be rendered beginning from the point which occurs exactly one hour and five minutes from the beginning of media file 237. In another embodiment, time code 236 may be modified continuously until receipt of data file 102 by a sister device. For instance, time code 236 may identify the temporal starting point "1:05+elapsed time", indicating that upon receipt of data file 102, media file 237 is to be rendered beginning from the point which occurs exactly one hour and five minutes from the beginning of media file 237 plus the elapsed time between transmission of data file 102 by master device 101 and receipt of data file 102 by sister device 105. In this instance, if exactly one minute elapsed between transmission and receipt of data file 102, the temporal starting point would be the point which occurs exactly one hour and six minutes from the beginning of media file 237.

Figure 3:
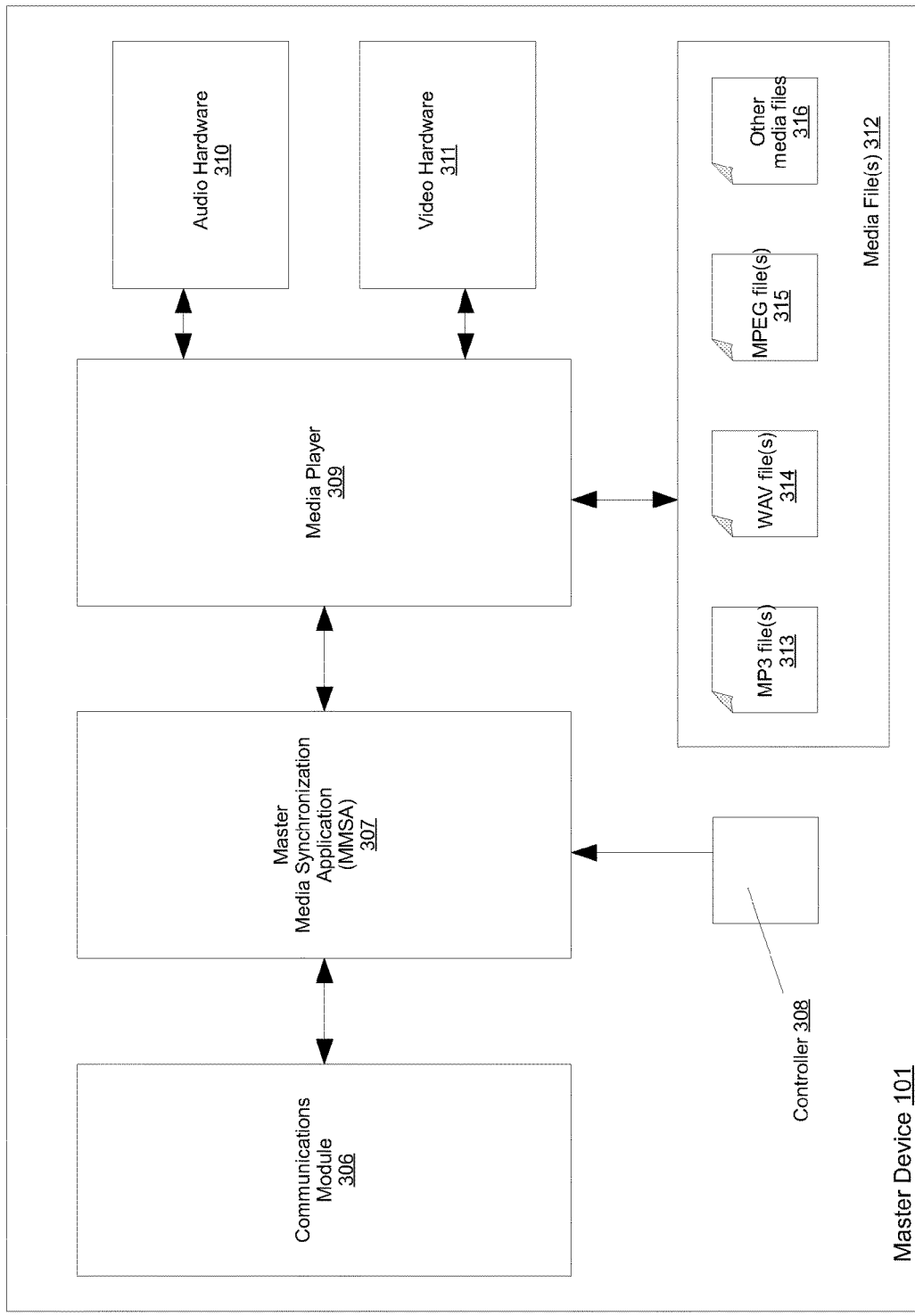
FIG. 3 is a functional block diagram illustrating in greater detail the master device introduced in conjunction with FIG. 1.

FIG. 3 is a functional block diagram illustrating in greater detail the master device introduced in conjunction with FIG. 1. As illustrated, master device 101 includes a media player 309, which may be RealPlayer®, Windows Media® Player, a digital video player, a digital audio player, or any other application or device capable of rendering audio content, media content, or audiovisual content. Media player 309 is capable of playing media file(s) 312, which may be MP3 file(s) 313, WAV file(s) 314, MPEG file(s) 315, or other media file(s) 316. Media player 309 may render a media file 312 using audio hardware 310, video hardware 311, or some combination of both. Alternatively, the media player 309 could render the media file 312 using software, such as streaming it using communications module 306.

Master Media Synchronization Application (MMSA) 307 is a software application which may be instructed to search for the presence of a sister device such as sister device 105 illustrated in FIG. 1. Upon discovering that a sister device is present, MMSA 307 may be instructed to cause the media file 312 to be synchronously rendered on master device 301 and sister device 105. MMSA 307 interacts with media player 309 in a manner that allows identification of media file 312 which is being rendered by media player 309. MMSA 307 generates a media code 235 (e.g., see FIG. 2) which identifies media file 312.

MMSA 307 also determines the precise amount of time which has elapsed from the beginning of media file 312 to the point in media file 312 which is currently being rendered by media player 309, and converts that time into a time code 236 (e.g., see FIG. 2). For instance, if media player 309 is currently playing a scene from media file 312 which occurs exactly one hour and five minutes from the beginning of media file 312, the time code 236 may be "1:05". Alternatively, the user of master device 101 may use controller 308 to set time code 236 to correspond to any temporal point within media file 312. After MMSA 307 generates the media code 235 and the time code 236, MMSA 307 creates a data file 102 which includes media code 235 and time code 236. MMSA 307 also determines whether media file 312 contains permissions enabling the user to view and/or listen to media file 312 on a sister device. If media file 312 contains the necessary permissions, MMSA 307 includes media file 312 in data file 102. If media file 312 does not contain the necessary permissions, MMSA 307 omits media file 312 from data file 102.

After MMSA 307 generates data file 102, MMSA 307 transmits data file 102 to the communications module 306 resident on the master device 101. The communications module 306 is a component configured to facilitate digital or analog communications between the master device 101 and any other device, such as over a network, using wireless communications, or the like. In one specific implementation, communications module 306 may be implemented as an ethernet or Bluetooth® driver stack, although many other examples will become apparent to those skilled in the art. Communications module 306 transmits the data file 102 to sister device 105 through middleware server 104. In another embodiment, master device 101 may transmit data file 102 directly to sister device 105.

Figure 4:
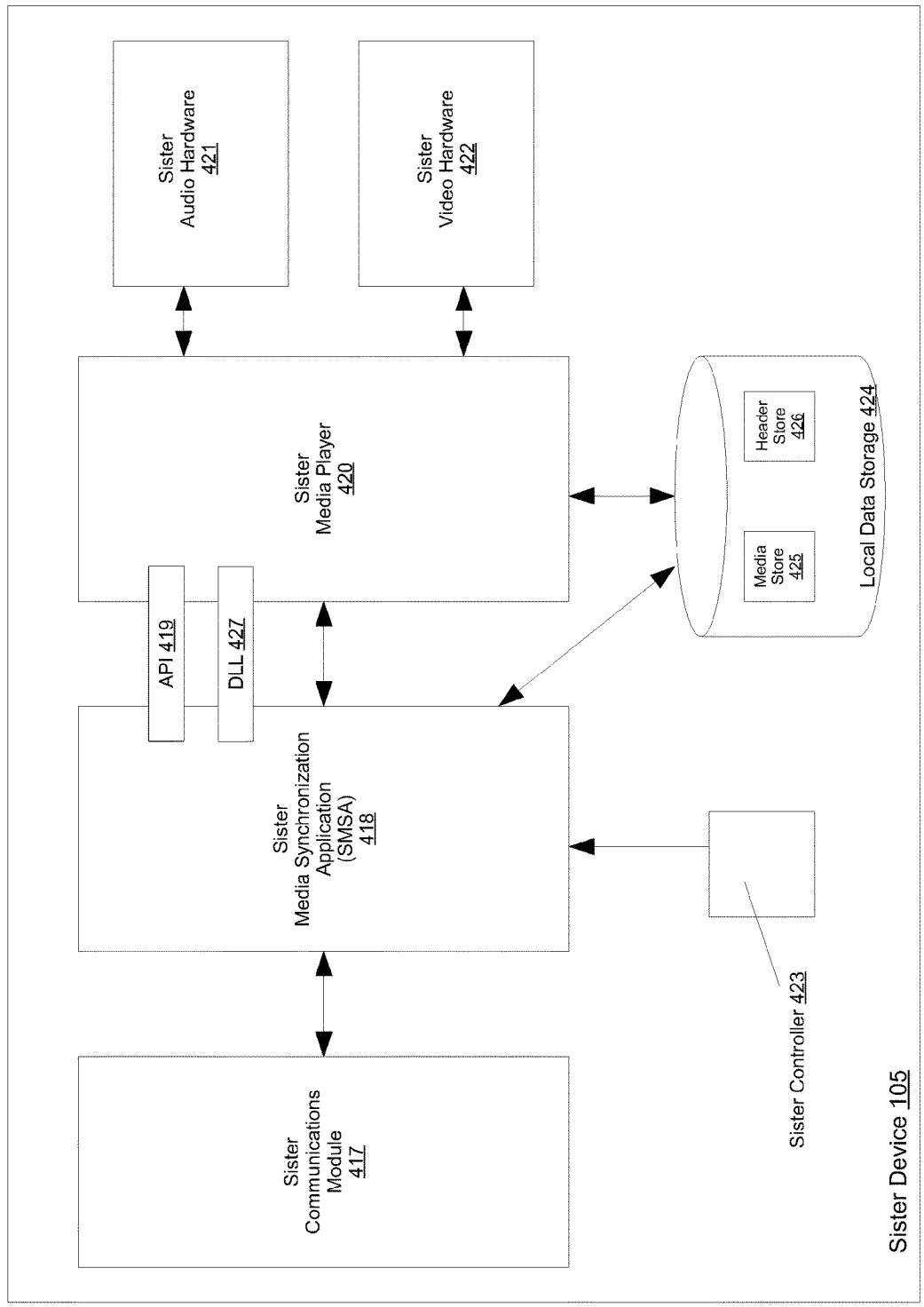
FIG. 4 is a functional block diagram illustrating in greater detail the sister device introduced in conjunction with FIG. 1.

FIG. 4 is a functional block diagram illustrating in greater detail the sister device introduced in conjunction with FIG. 1. Sister device 105 includes a sister device communications module 417, configured to be interoperative with communications module 306, which receives data file 102 and transmits data file 102 to sister media synchronization application (SMSA) 418. Sister device 105 further includes local data storage 424, which includes media store 425 and header store 426. SMSA 418 stores media file 237 (e.g., see FIG. 2) in media store 425, and also stores header 234 (e.g., see FIG. 2) in header store 426. As previously described with respect to FIG. 2, header 234 includes time code 236. SMSA 418 reads time code 236 and instructs sister media player 420 to render media file 237 from the temporal starting point identified by time code 236.

Subsequently, sister media player 420 renders media file 237 using audio hardware 310, video hardware 311, or both, beginning at the temporal starting point identified by time code 236. Alternatively, the sister media player 420 could render the media file 237 using software, such as streaming it using sister communications module 417. The user of sister media player 420 may modify the temporal starting point using sister controller 423. Sister media player 420 may be RealPlayer®, Windows Media® Player, a digital video player, a digital audio player, or any other application or device capable of rendering audio content, media content, or audiovisual content. A user application programming interface (API 419) may link SMSA 418 with sister media player 420. SMSA 418 and sister media player 420 may also share resources via a dynamic link library (DLL) 427. SMSA 418 and MMSA 307 may have the capability of being remotely updated by authorized persons.

If data file 102 does not include media file 237, then SMSA 418 reads media code 235 in data file 102 and searches media store 425 for media file 237, which is identified by media code 235. If SMSA 418 locates media file 237 in media store 425, then SMSA 418 instructs sister media player 420 to render media file 237 from the temporal starting point identified by time code 236. If SMSA 418 does not locate media file 237 in media store 425, then SMSA 418 transmits a request to middleware server 104 to search for media file 237. SMSA 418 may also transmit a request to middleware server 104 to search for media file 237 in the event that data file 102 contains a media file which is corrupted, violates a third party's intellectual property rights, or which is otherwise impossible to render or not permitted to be rendered on sister device 105.

Figure 5:
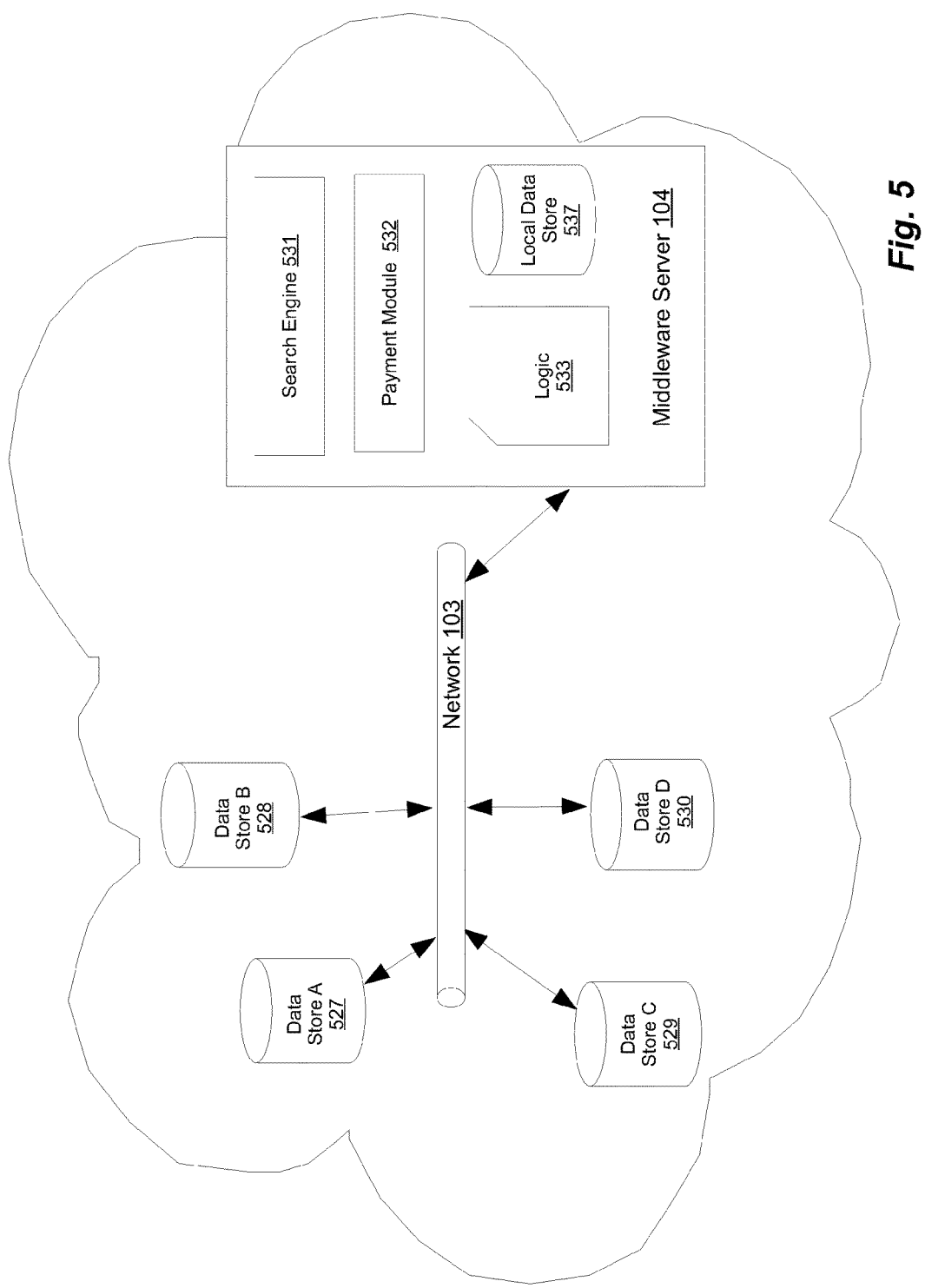
FIG. 5 is a functional block diagram illustrating in greater detail the middleware server and the network introduced in conjunction with FIG. 1.

FIG. 5 is a functional block diagram illustrating in greater detail the middleware server and the network introduced in conjunction with FIG. 1. As illustrated, middleware server 104 includes a search engine 531, a payment module 532, and a logic 533. The middleware server 104 is connected to network 103 which is associated with disparate storage devices (e.g., data store A 527, data store B 528, data store C 529, and data store D 530), on which media files and other information can be stored.

Upon receipt of a request from SMSA 418 to search for media file 237, search engine 531 searches various data stores connected over network 103 to determine whether media file 237 is available on any of the various storage devices (e.g., data store A-D (527-530)) coupled to network 103. When search engine 531 locates media file 237 on network 103, search engine 531 instructs payment module 532 to arrange for payment for media file 237. Payment module 532 arranges for payment for media file 237 and, after the payment transaction is complete, authorizes logic 533 to acquire media file 237. Logic 533 causes media file 237 to be retrieved over network 103 from the appropriate storage device on which media file 237 is found to the middleware server 104. The logic 533 may then configure media file 237 to make it capable of being rendered on sister device 105. For example, logic 533 may convert media file 237 to the proper format, file size, encryption, digital rights management (DRM) and other specifications so as to enable media file 237 to be rendered on sister device 105. This configuration process may take place in a buffer or other data storage facility (e.g., local data store 537) in the middleware server 104. When the configuration process is complete, middleware server 104 transmits media file 237 to sister device 105.

Figure 6:
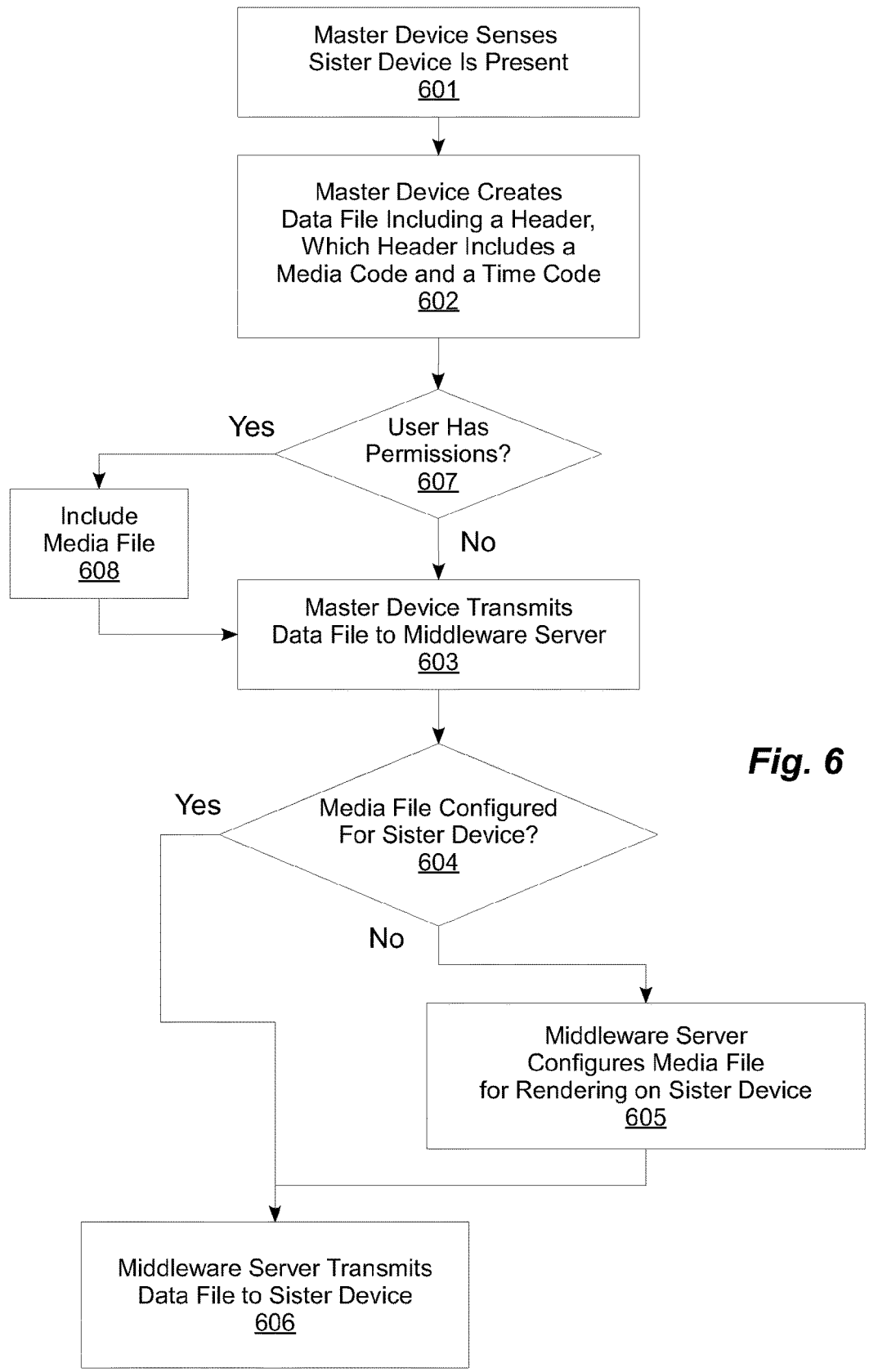
FIG. 6 is an operational flow diagram generally illustrating a process for transmitting a data file between a master device and a sister device in such a manner as to ensure synchronization of media.

FIG. 6 is an operational flow diagram generally illustrating a process for transmitting a data file between a master device and a sister device in such a manner as to ensure synchronization of media. The process includes operation 601, at which the master device senses the sister device is present. At operation 602, the master device creates a data file including a header, which header includes a media code and a time code. At operation 604, if the master device user has the permissions necessary to allow the media file identified by the media code to be rendered on both the master device and the sister device, as in this particular example, the data file also includes the media file (operation 608).

At operation 603, the master device transmits the data file to the middleware server. If the media file is already configured in a form which enables it to be rendered on the sister device, the middleware server may transmit the data file directly to the sister device without further modification. In this particular embodiment, at operation 604, the middleware server configures the media file for rendering on the sister device. At operation 605, the middleware server transmits the data file to the sister device.

Figure 7A:
FIG. 7A is another operational flow diagram generally illustrating a process for receiving a data file at a sister device in such a manner as to ensure synchronization of media.

FIG. 7A is another operational flow diagram generally illustrating a process for receiving a data file at a sister device in such a manner as to provide synchronization of media. The process includes operation 701, at which the sister device receives a data file including a header, which header includes a media code and a time code. At operation 702, the sister media synchronization application (SMSA) stores the header in the header store which is included on the sister device. In this particular example, the data file includes the media file which is identified by the media code. At operation 703, the SMSA searches the media store on the sister device to determine whether the media file identified by the media code is present. In this particular example, the media file is present on the media store, and the SMSA locates the media file in the media store at operation 704. At operation 705, the SMSA retrieves the header from the header store on the sister device. At operation 706, the SMSA instructs the sister media player to render the media file beginning from the temporal starting point identified by the time code in the header. At operation 707 the sister media player renders the media file.

Figure 7B:
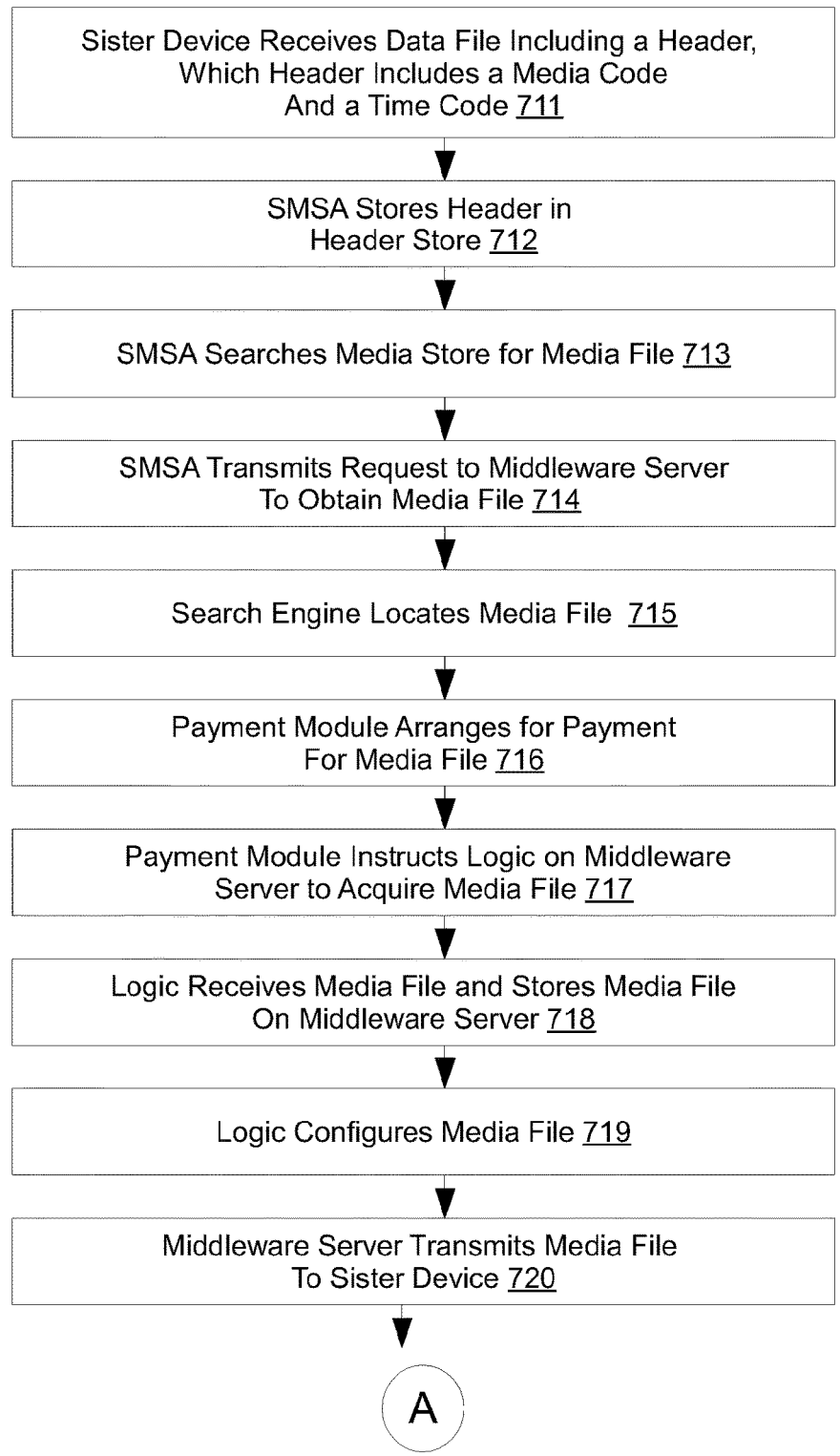
FIG. 7B is yet another operational flow diagram generally illustrating a process for receiving a data file at a sister device in such a manner as to ensure synchronization of media.
Figure 7C:
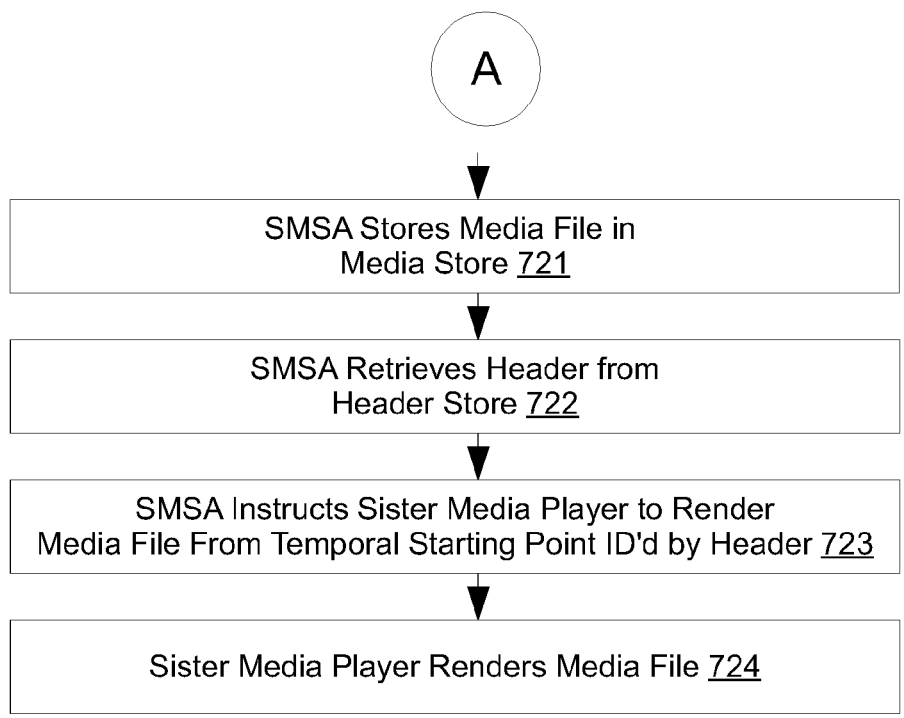
FIG. 7C is still yet another operational flow diagram generally illustrating a process for receiving a data file at a sister device in such a manner as to ensure synchronization of media.

FIGS. 7B and 7C are other operational flow diagrams generally illustrating an alternative process for receiving a data file at a sister device in such a manner as to provide synchronization of media. The process includes operation 711, at which the sister device receives a data file including a header, which header includes a media code and a time code. At operation 712, the sister media synchronization application (SMSA) stores the header in the header store which is included on the sister device. In this particular example, the data file does not include the media file which is identified by the media code. At operation 713, the SMSA searches the media store on the sister device to determine whether the media file identified by the media code is present. In this particular embodiment, the media file is not present on the media store.

At operation 714, the SMSA transmits a request to the middleware server to obtain the media file. Subsequently, at operation 715, the search engine resident on the middleware server locates the media file on the network to which the middleware server is connected. At operation 716, the payment module resident on the middleware server arranges for payment for the media file. At operation 717, payment module instructs the logic resident on the middleware server to acquire the media file. At operation 718, the logic receives the media file and stores the media file on the middleware server. In this particular embodiment, when the media file reaches the middleware server, the media file is not configured in a manner which allows it to be rendered on the sister device. In one example, the media file may be configured in the manner described above with respect to FIG. 5. At operation 719, the logic resident on the middleware server configures the media file in a manner which allows it to be rendered on the sister device. In one example, configuring the media file is accomplished by At operation 720, the middleware server transmits the media file to the sister device.

At operation 721, the SMSA stores the media file in the media store located on the sister device. At operation 722, the SMSA retrieves the header from the header store on the sister device. At operation 723, the SMSA instructs the sister media player to render the media file beginning from the temporal starting point identified by the time code in the header. At operation 724, the sister media player renders the media file.

FIG. 8 illustrates by way of a schematic flow diagram another embodiment of the present system and method for media synchronization. In operation 801, a data file is received by a sister device. In operation 802, the data file is stored by the sister device, which stores the header in the header store and, if the media file is present, also stores the media file in the media store. Operation 803 is a decision block that determines if the media file is received by the sister media synchronization application (SMSA). If the media file is not present, the sister media synchronization application (SMSA) requests the middleware server obtain the media file as illustrated by operation 804. If the media file is present, the SMSA retrieves the header from the header store as illustrated by operation 813.

At operation 805, the search engine located on the middleware server searches the data stores on the network to which the middleware server is coupled, in an attempt to locate the media file. Operation 806 is a decision block that determines if the media file is available. If the media file is not available at operation 806, then a message is sent to the sister device to inform the sister device user that the media file is unavailable at operation 807, where the process ends. If the media file is available at operation 806, then the payment module on the middleware server arranges for payment for the media file at operation 808. At operation 809, the media file is retrieved by the middleware server. At operation 810, the logic on the middleware server configures the media file in a manner that makes the media file capable of being rendered on the sister device. At operation 811, the media file is transmitted from the middleware server to the sister device. At operation 812, the media file is stored by the sister device.

Operation 814 is a decision block that determines if a sister controller is used to override the original time code obtained from the header. If the user of the sister device uses the sister controller to override the original time code in the header at operation 814, then the sister media player is requested to render the media file beginning at the temporal starting point identified by the sister controller at operation 816. The sister media player then renders the media file at operation 817 and the process ends. If there is no sister controller override at operation 814, then the sister media player is requested to render the media file beginning at the temporal starting point identified by the time code in the header as illustrated by operation 815. The sister media player then renders the media file at operation 817 and the process ends.

FIG. 9 is a diagram generally illustrating a computer product configured to perform processing for the media synchronization system shown in FIG. 1. The computer program product 900 may take one of several forms, such as a computer-readable medium 902 having computer-executable instructions 904, a recordable medium 906, a communications medium 908, or the like. When the computer-executable instructions 904 are executed, a method is performed. The instructions 904 include, among others, receiving a data file at a sister device, the data file including a media code and a time code, the media code identifying a media file, and the time code identifying a temporal starting point within the media file; storing the data file; and rendering the media file from the temporal starting point.

Figure 10:
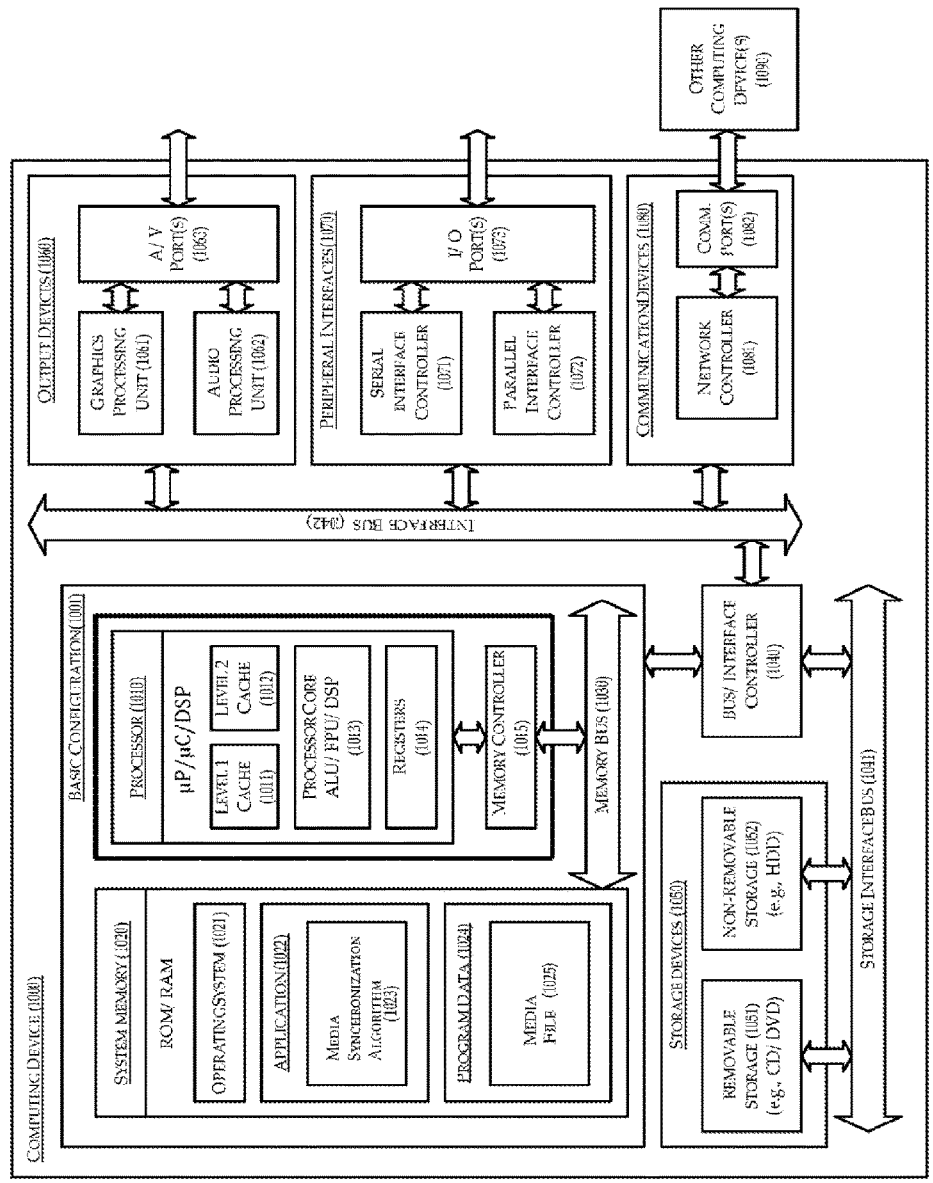
FIG. 10 is a functional block diagram generally illustrating an example computing device that is arranged for media synchronization in accordance with the present disclosure.

FIG. 10 is a functional block diagram generally illustrating an example computing device 1000 that is arranged for media synchronization in accordance with the present disclosure. In a very basic configuration 1001, computing device 1000 typically includes one or more processors 1010 and system memory 1020. A memory bus 1030 can be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one or more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP core), or any combination thereof. A memory controller 1015 can also be used with the processor 1010, or in some implementations, the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes a media synchronization algorithm 1023 that is configured to support the synchronizing of media file play between two or more devices. Program Data 1024 includes media file 1025 that is useful for media synchronization as has been further described above (e.g., please list some examples). In some embodiments, application 1022 can be arranged to operate with program data 1024 and an operating system 1021 such that media synchronization is facilitated between a master device and one or more sister devices. This described basic configuration is illustrated in FIG. 10 by those components within line 1001.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output devices 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

As will be appreciated by those persons skilled in the art, the system and method described herein affords distinct advantages not previously available to users of media files. The present system and method allows users to synchronize media files between a master device and a sister device exactly to a preferred point of usage, so that users of both devices are experiencing the same media file in the same temporal sequence. For instance, when both users are watching a movie, at all times the frame which is rendered on the master device will be identical to the frame which is rendered on the sister device. Further, the present system and method allows the user of a sister device to acquire and configure media files which were not originally present on the sister device, enabling the user of the sister device to experience the same media file which is being rendered on the master device, beginning at the same temporal starting point.

In another aspect, in this embodiment of the present system and method for media synchronization, each master device and each sister device may run a specialized media synchronization application that enables as much portability to other devices as the device technology allows and is made available by willing manufacturers and service providers. The ability to install a unified media player with the media synchronization application will speed adoption of the system as there will be fewer compatibility and updating issues to consider. Device portability options may be presented in an application menu for the SMSA. The media synchronization application for each master device and each sister device may be updated easily via application updates pushed from a central server system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various sports and embodiments disclosed herein are for purposes of illustration and are not intended to be limiting, with the true scope and spirit being indicated by the following claims.

What is claimed is:

1. A method for media synchronization between two or more media devices, the method comprising:
    streaming a media file, by a source device, to a first media device, wherein the media file is resident on the source device;
    determining an amount of time that has elapsed from a first temporal point in the media file to a second temporal point in the media file;
    converting the amount of time to a time code that identifies a starting point in the media file;
    receiving, from a second media device, a request to stream the media file resident on the source device to the second media device, wherein the request is received in response to a determination, by the second media device, that the media file is corrupted; and
    in response to the request:
        configuring the media file to be streamed to the second media device; and
        streaming the media file from the source device to the first media device and simultaneously streaming the media file from the source device to the second media device, wherein the streaming of the media file to the first media device and the second media device begins at the starting point in the media file as identified by the time code and the media file remains resident on the source device.

2. The method of claim 1, wherein the starting point is a first starting point, the method further comprising:
    receiving an input from the second media device, wherein the input includes an override of the time code and a second starting point, wherein the second starting point is different from the first starting point,
    wherein streaming the media file to the second media device begins at the second starting point instead of the first starting point based on the override of the time code.

3. The method of claim 1, further comprising modifying the starting point based on an elapsed time of transmission of the media file to the second media device.

4. The method of claim 1, wherein the media file is selected from the group consisting of a text file, a data file, an audio file, a video file, and an audiovisual file.

5. The method of claim 1, wherein the second media device is selected from the group consisting of a home media server, a digital video server, a video receiver, a computer, a cellular telephone, a smart telephone, a personal digital assistant, a digital music player, a digital video player, a portable video player, a wireless handheld device, a mobile communication device, a vehicle navigation system, a vehicle media system, a laptop personal computer, a notebook, and a mobile computing device.

6. The method of claim 1, wherein configuring the media file includes converting the media file to a format, file size, or encryption capable of being rendered by the second media device.

7. The method of claim 1, further comprising, prior to configuring the media file to be streamed to the second media device, determining whether the media file includes a permission that allows the media file to be rendered on the second media device.

8. The method of claim 7, wherein the permission is associated with a user of the second media device.

9. The method of claim 8, wherein, if the media file fails to include the permission, the method further comprises arranging payment for the media file in order for the media file to be rendered on the second media device.

10. The method of claim 1, further comprising retrieving the media file from the first media device prior to streaming the media file to the second media device.

11. A computing device, comprising:
a processor;
a memory, wherein a media file is resident in the memory;
a transmitter effective to be in communication with the processor; and
a receiver effective to be in communication with the processor;
the transmitter effective to stream the media file to a first media device;
the processor effective to:
  determine an amount of time that has elapsed from a first temporal point in the media file to a second temporal point in the media file; and
  convert the amount of time to a time code that identifies a starting point in the media file;
the receiver effective to receive, from a second media device, a request to stream the media file to the second media device, wherein the request is received in response to a determination, by the second media device, that the media file is corrupted;
in response to the request, the processor is further effective to:
  configure the media file to be streamed to the second media device;
the transmitter further effective to:
  stream the media file to the first media device and simultaneously stream the media file to the second media device, wherein the stream of the media file begins at the starting point in the media file as identified by the time code and the media file remains resident in the memory.

12. The computing device of claim 11, wherein the starting point is a first starting point, and the receiver is further effective to:
receive an input from the second media device, wherein the input includes an override of the time code and a second starting point, and wherein the second starting point is different from the first starting point,
wherein the stream of the media file to the second media device begins at the second starting point instead of the first starting point based on the override of the time code.

13. The computing device of claim 11, wherein the processor is further effective to modify the starting point based on an elapsed time of transmission of the media file from the transmitter to the second media device.

14. The computing device of claim 11, wherein configuration of the media file includes conversion of the media file to a format, file size, or encryption capable of being rendered by the second media device.

15. The computing device of claim 11, wherein the media file is a first media file, and wherein the processor is further effective to:
in response to the determination that the first media file is corrupted, the processor is further effective to:
  search for a second media file; and
  configure the second media file to be streamed to the second media device;
the transmitter effective to:
  stream the second media file to the second media device, wherein the stream of the second media file begins at the starting point in the second media file as identified by the time code.

16. The computing device of claim 11, wherein the processor is further effective to retrieve the media file from the first media device prior to the stream of the media file to the second media device.

17. A non-transitory computer-readable medium encoded with computer-executable instructions to synchronize media, the instructions effective to:
stream a media file from a source device to a first media device, wherein the media file is resident on the source device;
determine an amount of time that has elapsed from a first temporal point in the media file to a second temporal point in the media file;
convert the amount of time to a time code that identifies a starting point in the media file;
receive, from a second media device, a request to stream the media file resident on the source device to the second media device, wherein the request is received in response to a determination, by the second media device, that the media file is corrupted; and
in response to the request:
  configure the media file to be streamed to the second media device; and
  stream the media file from the source device to the first media device and simultaneously stream the media file from the source device to the second media device, wherein the stream of the media file begins at the starting point in the media file as identified by the time code and the media file remains resident on the source device.

18. The non-transitory computer-readable medium of claim 17, further including instructions to modify the starting point based on an elapsed time of transmission of the media file to the second media device.

19. The non-transitory computer-readable medium of claim 17, wherein the configuration of the media file includes conversion of the media file to a format, file size, or encryption capable of being rendered by the second media device.

20. The non-transitory computer-readable medium of claim 17, further including instructions to, prior to configuration of the media file to be streamed to the second media device, determine whether the media file includes a permission that allows the media file to be rendered on the second media device.

* * * * *